Aug. 16, 1927.
R. A. McCARTY
1,638,949
CLUTCH MOTOR
Filed Aug. 7, 1926
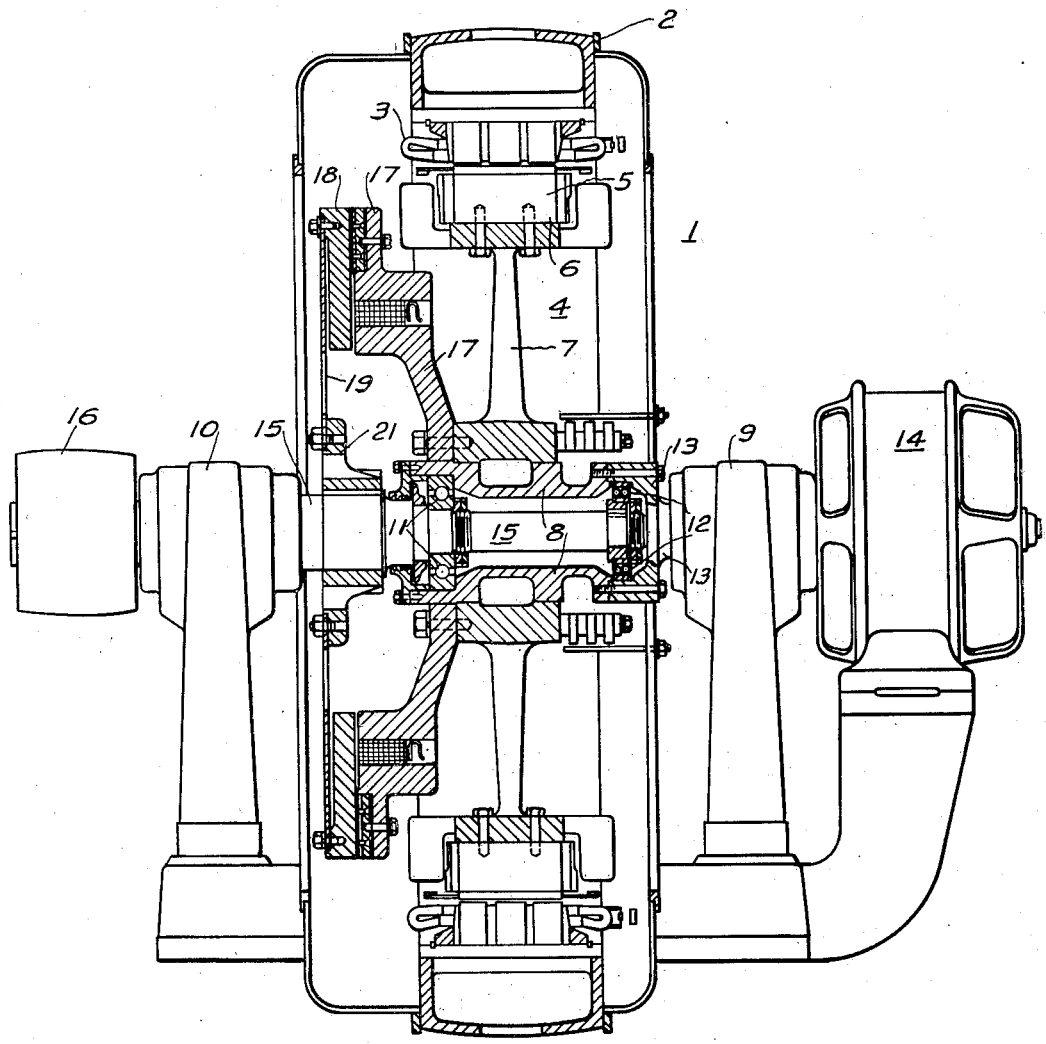
WITNESSES:
E. A. McCloskey
O. B. Buchanan
INVENTOR
Roy A. McCarty
BY Chesley G. Carr
ATTORNEY Patented Aug. 16, 1927.

1,638,949

UNITED STATES PATENT OFFICE.

ROY A. McCARTY, OF WILKINSBURG, PENNSYLVANIA, ASSIGNOR TO WESTINGHOUSE ELECTRIC & MANUFACTURING COMPANY, A CORPORATION OF PENNSYLVANIA.

CLUTCH MOTOR.

Application filed August 7, 1926. Serial No. 127,874.

My invention relates to clutch motors and it has particular relation to a synchronous electric motor having a direct-connected exciter on one end, a mechanical driving connection with a load at the other end and an electro-magnetic clutch inside the motor frame whereby the load may be started up after the rotor member of the motor has attained synchronous speed.

Synchronous clutch motors have been made heretofore, as shown, for example, in the pending application of Stephen A. Staege, Serial No. 708.896, filed April 25, 1924, and assigned to the Westinghouse Electric & Manufacturing Company. However, no synchronous clutch motor has heretofore been made wherein it was possible to mount a direct-connected exciter on the motor, or, in general, wherein it was possible to mount a direct-connected load device on a shaft which is turning at synchronous speed at all times whenever the motor is in operation, regardless of whether the magnetic clutch is energized or deenergized.

With the foregoing and other objects in view, my invention consists in the details and combinations hereinafter described and claimed in the accompanying drawing, the single figure of which is a longitudinal sectioned elevation of a synchronous clutch motor with direct-connected exciter, in accordance with my invention.

As shown in the drawing, a synchronous motor 1 is provided, having a stator member 2, which is provided with alternating-current primary windings 3, and a salient-pole rotor member 4, having direct-current excited salient pole members 5 mounted on a suitable magnetizable core member 6 and a spider 7 which, in turn, is mounted on a hollow shaft or sleeve 8.

The stator member comprises also two pedestal bearings 9 and 10, one mounted at each end of the stator member. The sleeve 8 of the rotor member is provided also with two bearings 11 and 12, within the same, disposed one at each end thereof.

Secured to one end of the sleeve 8 is a shaft 13 which is a part of the rotor member and extends through one bearing 9 of the stator member. Mounted on the free end of the shaft 13 just mentioned is a direct-connected exciter 14 which is thus driven whenever the rotor member rotates.

The shaft 13 thus constitutes, in effect, an extension of the sleeve 8, and the bearing 12 may actually be located either in the sleeve 8 or in the shaft 13. It is to be understood that the two constructions are altogether equivalent.

A second shaft 15 is provided which is supported by the other bearing 10 of the stator member and by both bearings 11 and 12 within the sleeve 8. The second shaft extends through the stator bearing 10 and is provided, on its overhanging end, with a pulley 16 or other means for mechanically connecting a load which requires a relatively large starting torque.

A magnetic clutch is provided, comprising a clutch field member 17 which is suitably mounted on the spider 7 or other convenient part of the rotor member, and a cooperating clutch armature member 18 which is suitably mounted, as by means of a resilient disc 19 and hub 21 pressed on the second shaft 15, in close proximity to the field member of the clutch, whereby, when the clutch field member is excited, the clutch armature will be drawn into engagement therewith, against the resiliency of the disc-supporting member 19, causing a driving torque to be gradually applied to the load after the rotor member of the synchronous motor has been brought up to synchronous speed, with the load detached.

There are many advantages incident to the construction hereinabove described, in addition to the possibility of utilizing a direct-connected exciter, whereby the exciting current for the synchronous motor may be supplied by the machine itself instead of requiring a separate motor-generator set or other source of direct current, as was necessary for the clutch motors of the prior art.

Among the other advantages of my construction, which may be mentioned, are the very great accessibility of the parts, whereby all of the parts may be withdrawn from their respective shafts, from one end of the machine, without pressing off the hub 21 of the clutch from the second shaft 15.

By mounting the driving pulley 16 at the same end of the machine as the clutch members 17 and 18, it is possible to utilize a much smaller drive shaft 15 than was possible where the torque had to be transmitted throughout the entire length of the machine to the end opposite the clutch, as in the clutch motor shown in the above-mentioned Staege application.

By the utilization of accurately-fitting bearings 11 and 12 within the sleeve member 8, which, in fact, constitutes a part of a hollow shaft 8, 13, supporting an end of the second shaft 15 therein, very close clearances may be provided for, thus preventing undue loose play or whipping of the two-part shaft construction.

The foregoing and other advantages are obtained by my construction, and, while I have illustrated my invention in its preferred application and in a preferred construction of the various parts, I wish it to be understood that such illustration is merely for the purpose of disclosing the invention and not for the purpose of limiting by claims to such details of construction as may be shown but not claimed.

I claim as my invention:

1. A clutch motor comprising an electric motor having a stator member and a rotor member, said stator member comprising two bearings, said rotor member comprising a hollow shaft extending through one of said bearings, a load device mounted outside of said bearing on the extending end of said shaft, a second shaft freely rotatable within said hollow shaft and supported by the other of said bearings, a load device mechanically coupled to said second shaft, and a clutch disposed on said second shaft between said other of said bearings and said rotor member, whereby torque may be transmitted thereto, at times.

2. A clutch motor comprising an electric motor having a stator member and a rotor member, said stator member comprising two bearings, said rotor member comprising electric windings, a core member, a sleeve member supporting said core member, a bearing within said sleeve member at each end thereof, and a shaft secured to one end of said sleeve member and extending through one of the bearings of the stator member, a load device mounted outside of said last-mentioned bearing on the extending end of said shaft, a second shaft supported by the other bearing of the stator member and by both of the bearings within said sleeve member, a load device mechanically coupled to said second shaft, and a magnetic clutch having one part secured to said rotor member and another part secured adjacent thereto on said second shaft.

3. A clutch motor comprising a synchronous electric motor having a stator member and a rotor member, said stator member comprising two bearings, said rotor member comprising a hollow shaft extending through one of said bearings, a direct-connected exciter mounted outside of said bearing on the extending end of said shaft, a second shaft freely rotatable within said hollow shaft and supported by the other of said bearings, a load device mechanically coupled to said second shaft, and a magnetic clutch disposed on said second shaft between said other of said bearings and said rotor member, whereby torque may be transmitted thereto, at times.

4. A clutch motor comprising a synchronous electric motor having a stator member and a rotor member, said stator member comprising two bearings, said rotor member comprising electric windings, a core member, a sleeve member supporting said core member, a bearing within said sleeve member at each end thereof, and a shaft secured to one end of said sleeve member and extending through one of the bearings of the stator member, a direct-connected exciter mounted outside of said last-mentioned bearing on the extending end of said shaft, a second shaft supported by the other bearing of the stator member and by both of the bearings within said sleeve member, a load device mechanically coupled to said second shaft, and a magnetic clutch having one part secured to said rotor member and another part secured thereto on said second shaft.

In testimony whereof, I have hereunto subscribed my name this 28th day of July, 1926.

ROY A. McCARTY.